(12) United States Patent
Li et al.

(10) Patent No.: US 12,111,983 B2
(45) Date of Patent: Oct. 8, 2024

(54) COMPUTER MOUSE

(71) Applicant: LENOVO (SINGAPORE) PTE. LTD., Singapore (SG)

(72) Inventors: Scott Li, Morrisville, NC (US); Igor Stolbikov, Morrisville, NC (US); Rafael Rodrigues Machado, Morrisville, NC (US); Navneet Keshav, Morrisville, NC (US)

(73) Assignee: LENOVO (SINGAPORE) PTE. LTD, Singapore (SG)

( * ) Notice: Subject to any disclaimer, the term of this patent is extended or adjusted under 35 U.S.C. 154(b) by 0 days.

(21) Appl. No.: 18/083,487

(22) Filed: Dec. 17, 2022

(65) Prior Publication Data

US 2024/0201799 A1 Jun. 20, 2024

(51) Int. Cl.
*G06F 3/0354* (2013.01)
*G06F 3/01* (2006.01)
*G06F 3/0485* (2022.01)
*G06F 3/16* (2006.01)

(52) U.S. Cl.
CPC .......... *G06F 3/03543* (2013.01); *G06F 3/016* (2013.01); *G06F 3/0485* (2013.01); *G06F 3/167* (2013.01); *G06F 2203/04806* (2013.01)

(58) Field of Classification Search
CPC .... G06F 3/03543; G06F 3/033; G06F 3/0312; G06F 2203/0333; G06F 3/0485; G06F 2200/1637; G06F 3/04855
USPC ........................................................ 345/163
See application file for complete search history.

(56) References Cited

U.S. PATENT DOCUMENTS

| 6,128,006 | A | * | 10/2000 | Rosenberg | ............ G06F 3/0362 |
| | | | | | 345/184 |
| 6,424,357 | B1 | * | 7/2002 | Frulla | ...................... G06F 3/038 |
| | | | | | 715/728 |
| 6,956,558 | B1 | * | 10/2005 | Rosenberg | .............. G06F 3/016 |
| | | | | | 345/184 |
| 11,099,667 | B1 | * | 8/2021 | Cheng | ................... G06F 3/0362 |
| 2016/0233799 | A1 | * | 8/2016 | Wang | ........................ H02P 6/14 |
| 2016/0244293 | A1 | * | 8/2016 | Firth | ...................... B65H 75/38 |
| 2020/0034113 | A1 | * | 1/2020 | Holst, III | .............. G06F 3/0488 |
| 2020/0097100 | A1 | * | 3/2020 | Chang | ...................... G06F 3/0362 |
| 2020/0372911 | A1 | * | 11/2020 | Seo | ........................ G10L 15/20 |
| 2023/0280847 | A1 | * | 9/2023 | Vlasov | ..................... G05G 1/08 |
| | | | | | 345/184 |

FOREIGN PATENT DOCUMENTS

KR 102359964 B * 8/2022 ............. G10L 15/22

OTHER PUBLICATIONS

Logitech, Innovation Brief, MicroGear Precision Scroll Wheel and SmartShift Technology, 2006 (3 pages).
Alexander, Jason (PhD thesis), Understanding and Improving Navigation Within Electronic Documents, University of Canterbury (2009) (413 pages).

(Continued)

*Primary Examiner* — Koosha Sharifi-Tafreshi
(74) *Attorney, Agent, or Firm* — Brian J. Pangrle

(57) ABSTRACT

A computer mouse can include a scroll wheel assembly that includes a scroll wheel rotatable about a scroll wheel axis; and a motor assembly that includes a rotor aligned with the scroll wheel axis and operatively coupled to the scroll wheel.

18 Claims, 14 Drawing Sheets

(56) References Cited

OTHER PUBLICATIONS

Wilkofsky et al., How repeatable is two-finger tightness when used to tighten bone screws? (ORS 2013 Annual Meeting, Poster No. 1535) (3 pages).
Texas Instruments, DRV8303 Three-Phase Gate Driver With Dual-Current Shunt Amplifiers, SLOS846C, Sep. 2013, Revised Dec. 2016 (39 pages).
NXP B.V., AN11855, Voice Detection and Recognition, Application note, 2.0, Sep. 30, 2016 (22 pages).

* cited by examiner

COMPUTER MOUSE

TECHNICAL FIELD

Subject matter disclosed herein generally relates to input devices such as a computer mouse for computing and display devices.

BACKGROUND

A computer mouse can include buttons and a scroll wheel for receipt of input for a computing device, a display device, and/or another electronic device.

SUMMARY

A computer mouse can include a scroll wheel assembly that includes a scroll wheel rotatable about a scroll wheel axis; and a motor assembly that includes a rotor aligned with the scroll wheel axis and operatively coupled to the scroll wheel. Various other apparatuses, assemblies, systems, methods, etc., are also disclosed.

BRIEF DESCRIPTION OF THE DRAWINGS

Features and advantages of the described implementations can be more readily understood by reference to the following description taken in conjunction with examples of the accompanying drawings.

DETAILED DESCRIPTION

The following description includes the best mode presently contemplated for practicing the described implementations. This description is not to be taken in a limiting sense, but rather is made merely for the purpose of describing the general principles of the implementations. The scope of the invention should be ascertained with reference to the issued claims.

Figure 1A:
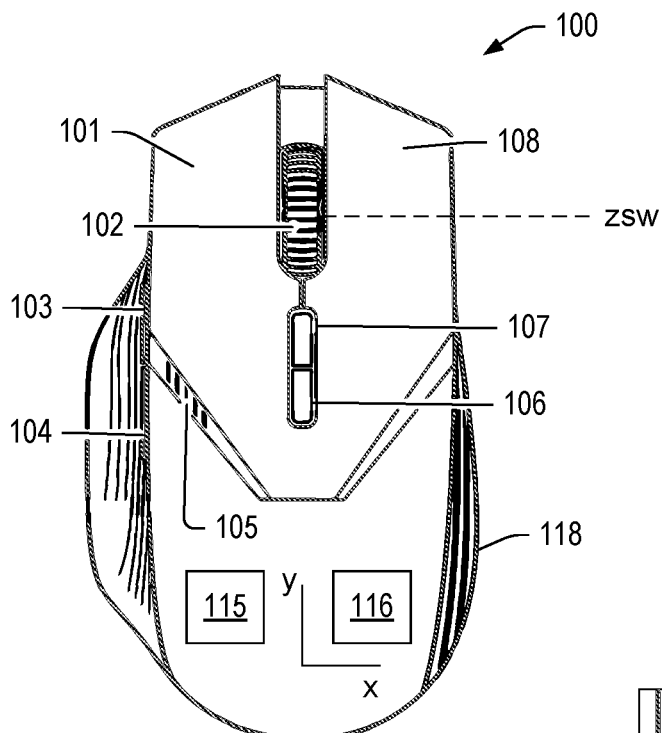
FIG. 1A, FIG. 1B, and FIG. 1C are views of an example of a computer mouse.
Figure 1C:
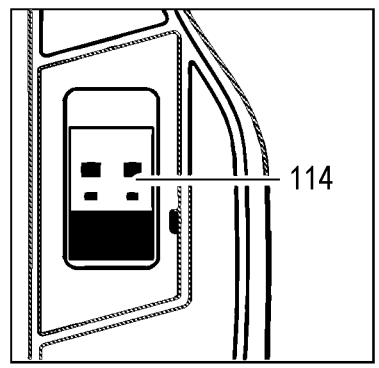
Figure 1B:
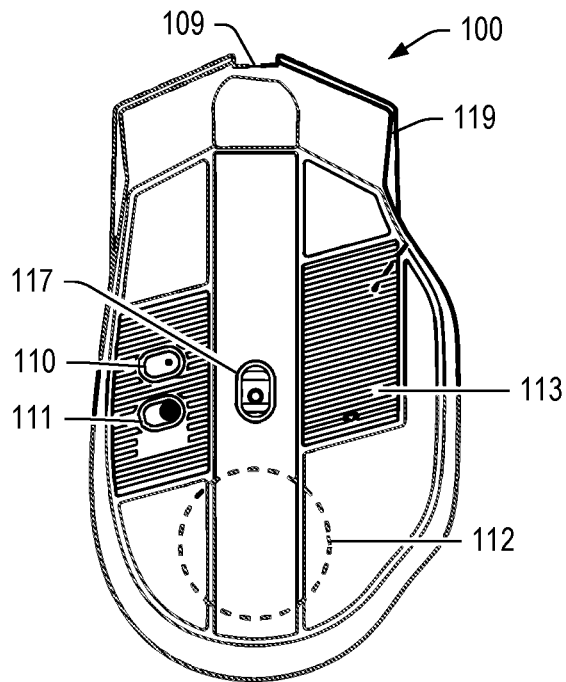

FIG. 1A, FIG. 1B and FIG. 1C show views of an example of a computer mouse 100. The computer mouse 100 can be a hand-held pointing device that can detect two-dimensional motion relative to a surface. As an example, such motion can be translated into motion of a pointer on a display, for example, for control of one or more graphical user interfaces rendered to a display of a display device. As shown, the computer mouse 100 may be defined in part using a coordinate system such as, for example, a Cartesian coordinate system where, for example, a longitudinal axis of the computer mouse 100 can be in a direction of a y-axis and a latitudinal axis of the computer mouse 100 can be in a direction of an x-axis where a z-axis can be used to define heights for one or more features.

As shown, the computer mouse 100 can include a left mouse button 101, a scroll wheel 102 (e.g., optionally including a middle button), a forward button and/or page up button 103, a backward button and/or page down button 104, a DPI level indicator and/or a charging indicator 105, a DPI down button 106, a DPI up button 107, a right mouse button 108, a USB-C port 109, a BLUETOOTH pairing button 110 (e.g., for BLUETOOTH circuitry and/or other wireless circuitry), a 2.4G/OFF/BLUETOOTH switch 111, a wireless charging area 112, a wireless USB receiver compartment 113, a wireless USB receiver 114, circuitry 115, a power source 116 (e.g., a rechargeable battery), and an optical assembly 117 (e.g., for sensing position and/or motion with respect to a surface). As an example, a computer mouse may include a cord with a connector such as, for example, a USB connector. As shown, the computer mouse 100 can include a housing that can be formed from an upper housing component 118 and a lower housing component 119 where the scroll wheel 102 is accessible via an opening in the upper housing component 118 and where the optical assembly 117 can be positioned with respect to an opening in the lower housing component 119.

As an example, various features of the computer mouse 100 can be mechanical, electrical, optical, magnetic, etc. For example, the scroll wheel 102 can be a mechanical part that may utilize one or more types of other parts to encode rotation of the scroll wheel 102 about a scroll wheel axis. As an example, the optical assembly 117 can include one or more LEDs, one or more lasers, one or more optical elements, one or more sensors, etc.

As shown in the example of FIG. 1A, the scroll wheel 102 may be rotatable forwardly and backwardly (along a y-axis direction and rotatable about a scroll wheel axis, zsw, that may be substantially parallel to the x-axis (e.g., plus or minus 25 degrees). Rotation of the scroll wheel 102 may be referred to as being in a clockwise direction and a counter-clockwise direction with respect to the scroll wheel axis zsw.

As an example, the computer mouse 100 may be a surface-independent optical mouse that includes an opto-electronic sensor (e.g., optionally a low-resolution video camera, etc.) as a type of circuitry to capture successive images of a surface on which the computer mouse 100 may operate. As an example, the circuitry 115 can include optoelectronic circuitry, one or more special-purpose image-processing chips, and one or more other types of circuitry.

As an example, the USB receiver 114 can be storable in a bay of the computer mouse 100 and removed to be plugged into a port of an electronic device. As an example, the computer mouse 100 may be operable with different electronic devices, optionally at the same time or in a selectable manner. For example, consider the computer mouse 100 as including a switch that can switch connection from one electronic device to another electronic device where, for example, each of the electronic devices may include a suitable receiver (e.g., an instance of the USB receiver 114, etc.).

Figure 2:
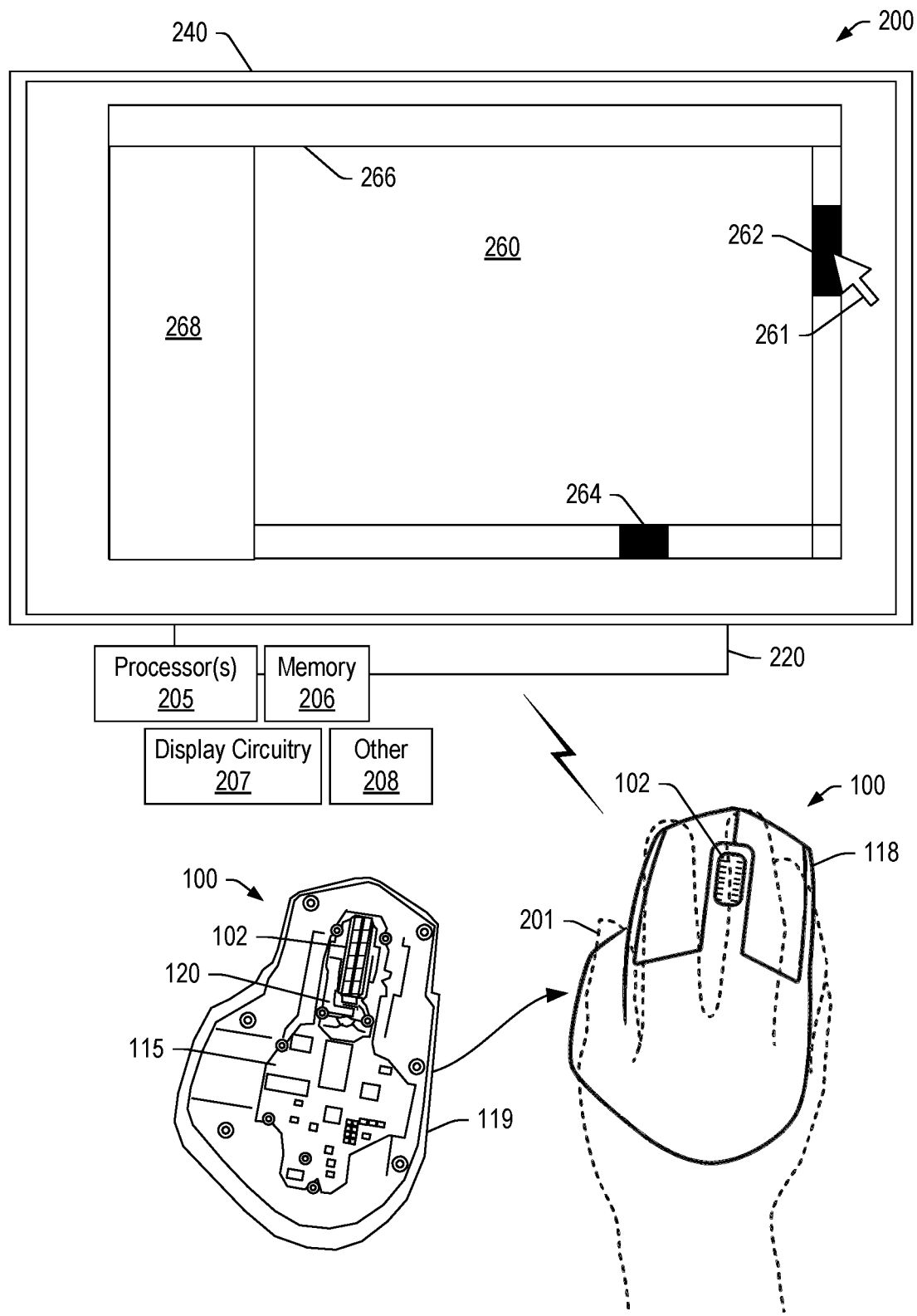
FIG. 2 is a diagram of an example of a system.

FIG. 2 shows an example of a system 200 that can include one or more processors 205, memory 206 accessible to at least one of the one or more processors 205, display circuitry 207 and one or more other components 208, which can include electronic circuitry, instructions stored in the memory 206 and executable by at least one of the one or more processors 205, etc.

As shown, the system 200 can be operable using the computer mouse 100, which may be manipulated using a human hand 201 that can rest on the computer mouse 100 where one or more fingers can interact with various features of the computer mouse 100. For example, consider the middle finger of the human hand 201 as being able to interact with the scroll wheel 102 to rotate it clockwise or counter-clockwise (e.g., forward or back).

As shown in FIG. 2, the computer mouse 100 can include the scroll wheel 102 and the circuitry 115. The circuitry 115 can include, for example, charging circuitry (e.g., an integrated circuit that provides for dual mode regulation to convert battery voltage into voltages for other integrated circuits, etc.); a main processor that can read signals from sensors and convert data into x,y cursor positions, etc.; a co-processors that can handle tasks such as pulsing LEDs and/or lasers, power management, etc.; a multi-axis gyroscope and/or accelerometer (e.g., for multi-dimensional position determinations, etc.); a thermopile detector that can detect movement under a laser; a wireless radio (e.g., BLUETOOTH circuitry, etc.); etc.

As to the main processor, consider a processor that can include one or more features of an ARM processor, which may have a 32-bit RISC core and associated memory. As to the co-processor, consider a co-processor that can include one or more features of an ATMEL processor, which can be a low-power CMOS 8-bit RISC microcontroller with associated memory.

In the example of FIG. 2, the computer mouse 100 is shown as optionally including a ratchet mechanism 120 that can provide for making the scroll wheel 102 click as it is rotated or making the scroll wheel 102 freely rotatable without making clicks. A mechanically clicking scroll wheel includes a physical component that interacts with a scroll wheel assembly to make clicks via contact between the physical component and one or more features of the scroll wheel assembly. Such types of physical contact may result in wear of one or more components, which may cause deterioration or other changes in clicking with respect to time (e.g., over a lifetime of a computer mouse).

As an example, the computer mouse 100 can include firmware and/or other instructions storable in memory and executable by one or more processors. As explained, the computer mouse 100 can be operatively coupled via wire and/or wirelessly (e.g., depending on features) to one or more electronic devices such that human interactions with the computer mouse 100 can cause actions to be taken by one or more electronic devices. As an example, a human interaction with the computer mouse 100 may be a physical interaction that involves hand contact. As explained herein, where the computer mouse 100 includes a motor assembly coupled to the scroll wheel 102 and/or voice recognition circuitry, the computer mouse 100 may optionally act without physical human contact, for example, via operation of the motor assembly and/or via response to sound (e.g., a human utterance, etc.).

As shown, the system 200 can include a base 220 and a display device 240, which may be configured as separate interoperable components, as a laptop computer, as an all-in-one (AIO) computer, etc. As shown, the display device 240 can be utilized to render a graphical user interface (GUI) 260 that can include a cursor 261 (e.g., pointer, etc.), a vertical scroll bar 262, a horizontal scroll bar 264, a horizontal menu 266 and a vertical menu 268. In such an example, the computer mouse 100 may be utilized to control one or more features of the GUI 260. As an example, the cursor 261 may be moved to control scrolling and/or the scroll wheel 102 may be used to control scrolling. As an example, the computer mouse 100 may include one or more programmable features. For example, consider programmable buttons, etc., that can be programmed with one or more commands. For example, consider a side button being programmed with an undo command (e.g., Ctrl+Z); noting that various other commands may be programmed in association with one or more buttons, etc.

While the example of FIG. 2 shows the GUI 260 as being akin to an application GUI for various tasks (e.g., word processing, document reading, web browsing, spreadsheet editing, etc.), the system 200 may be suitable for various other tasks, which can include video tasks, gaming tasks, etc. For example, the system 200 can include features of a gaming computer that can execute one or more computer games, which may be interactive games for local and/or remote interactions.

As an example, a game can be an action game where a user may interact with a computer mouse to navigate a scene, move within a scene, shoot an arrow using a bow, throw objects, grab objects, use supernatural powers, etc. Such interactions may involve use of a scroll wheel of the computer mouse. For example, scrolling to move forward or backward, scrolling to direct an object, etc.

For various types of applications, the scroll wheel of a computer mouse can be the most frequently used navigation tool. A thesis by Alexander, Understanding and Improving Navigation Within Electronic Documents, University of Canterbury (2009), which is incorporated by reference herein, reported that scroll wheel actions accounted for 68% of MICROSOFT WORD document processor navigation actions and 36% of ADOBE READER PDF reader navigation actions.

Figure 3:
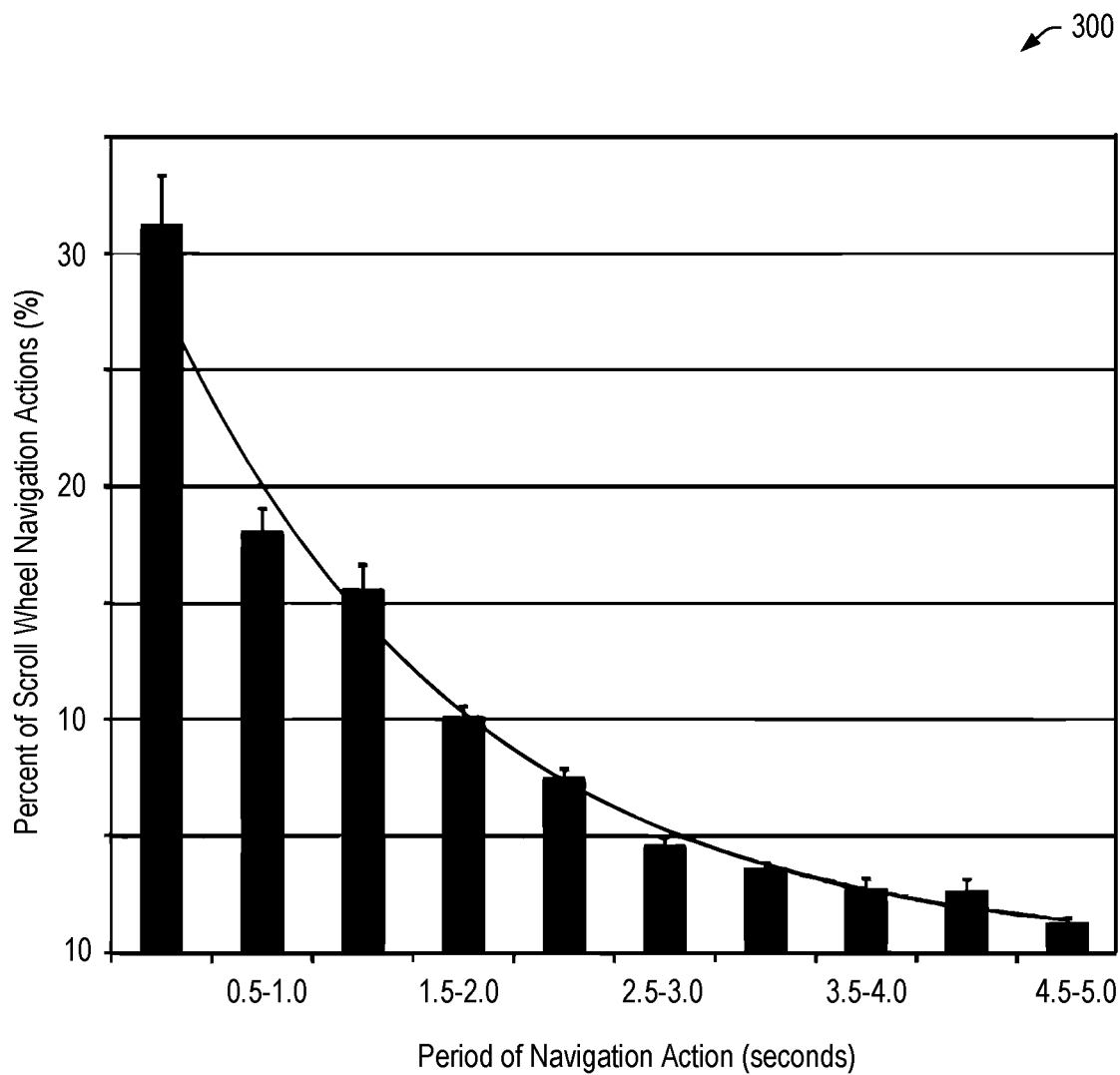
FIG. 3 is a diagram of an example of a plot.

FIG. 3 shows an example of a plot 300 of percent of scroll wheel navigation actions versus period of navigation action. As shown, scroll wheel actions tend to be relatively short, with a mean of 31% of actions taking less than half a second. Such actions represent users moving a few clicks of the scroll wheel, to navigate up or down a few lines in a document. As shown, ninety-five percent of the scroll wheel actions take between 1 second and 5 seconds. As an example, the mean time required to scroll a specified distance using the scroll wheel may be modeled by a non-linear relationship. For example, consider a monotonic non-linear model that can range from approximately 0.1 seconds to approximately 5 seconds where distance navigated ranges from a fraction of a page (e.g., 0.01 page) to multiple pages (e.g., 2 pages). As an example, a small fraction of a page (e.g., 0.1 page) may take 0.5 seconds; whereas, 2 pages may take more than 3 seconds. Such a non-linear model may be viable for a page range from 0 to 2 pages; however, outside of this range, movement times can become more diverse, which may be more challenging to reliably model. As an example, when moving small distances (<0.5 pages), users may move slowly as they are reading or accurately positioning a document, using only a few clicks of a scroll wheel; whereas, for larger distances (>0.5 pages) a flicking action of the scroll wheel becomes more probable, with users aware that their target is more than a few paragraphs away.

Above, clicks are mentioned, which pertain to a mechanical type of clicking that occurs when a scroll wheel is rotated (see, e.g., the example ratchet mechanism 120 of FIG. 2).

Such clicking can be turned on or off for various computer mice. For example, some LOGITECH computer mice (Logitech International S.A., Lausanne, Switzerland) include a ratchet mode and a free mode where the ratchet mode (e.g., detent mode) provides pre-determined clicks (e.g., mechanical clicks) responsive to rotation of the scroll wheel and where the free mode provides for rotation of the scroll wheel without clicks. To switch between ratchet mode (e.g., detent mode) and free mode of the scroll wheel, a circuit is used to energize a coil to move a detent mechanism or a motor set orthogonal to the scroll wheel, a cam, springs, a swing-arm, and a ball detent are utilized. As an example, a scroll wheel may include a detent mechanism or not and, where a detent mechanism is included, it may be switchable using one or more mechanisms. As explained, such a physical clicking mechanism involves contact between components, which may, over time, result in some amount of wear and possible degradation.

Figure 4A:
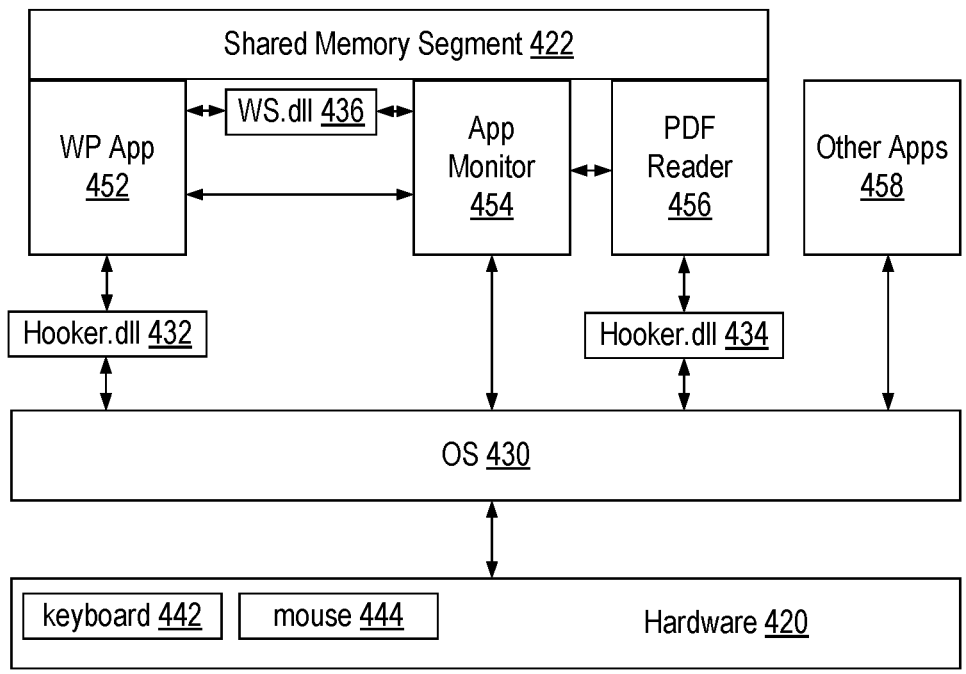
FIG. 4A and FIG. 4B are diagrams of examples of architectures.
Figure 4B:
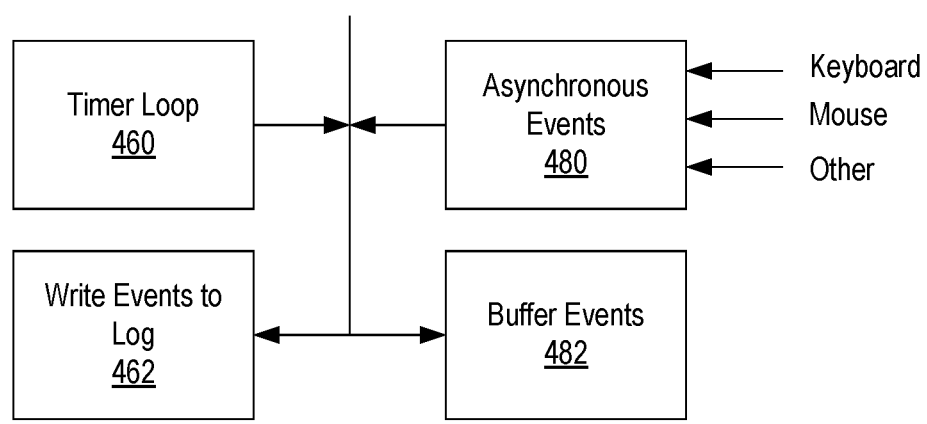

FIG. 4A and FIG. 4B show examples of architectures and interactions between a computer mouse and a computing device. As shown, hardware 420 can support a keyboard 442 and a computer mouse 444, along with an operating system (OS) 430 that can establish an operating system environment for operation of various applications 452, 454, 456 and 458. As shown, the application 452 may be a word processing (WP) application and the application 456 may be a PDF reader application. The application 454 can be an OS related component that monitors various applications, for example, using features such as one or more dynamic link libraries (dlls or DLLs). As shown, the WP application 452 may interact with the application monitor 454 using a WS.dll 436. Further, the OS 430 may interact with various applications using dynamic link libraries such as, for example, Hooker.dll 432 and Hooker.dll 434. In the example of FIG. 4A, the Hooker.dll 432 and/or the Hooker.dll 434 can intercept mouse and keyboard events, records them if necessary, and pass them to an appropriate application.

In FIG. 4B, an internal scheduling architecture is shown for an example of the application monitor 454, which can provide a timer loop 460 that can be operable (e.g., every 100 ms or so) to interact with asynchronous events 480, which may originate with devices such as, for example, a keyboard, a computer mouse, etc. As shown, per a write block 462, events can be written to a log and, per a buffer block 482, events can be buffered.

In the example of FIG. 4B, the timer loop 460 can handle various tasks such as, for example, interrogation of a list of known documents, interrogation of document scrollbars, and interrogation of other document properties (e.g., zoom changes, page status changes, etc.). As an example, a computer mouse may generate an event that can be directed to a document, for example, consider closing a document, minimizing a document, changing a position on a document, copying and/or pasting content in a document, deleting content in a document, scrolling in a document (e.g., change in scrollbar, etc.), zooming in a document, etc. Thus, events may be related to one or more applications via the application monitor 454 and/or one or more other approaches to performing tasks such as one or more of the tasks in the example of FIG. 4B.

As explained, streams of events can originate from regular polling (e.g., one or more timer loops 460) and can originate from interrupts (e.g., device interrupts, etc., that may be asynchronous events 480). As mentioned, an internal timer can triggers every set interval (e.g., 50 ms, 100 ms, 200 ms, etc.) causing the interrogation of a list of known documents, scrollbars of all open documents and other document properties. Such an interval tends to be not short enough to capture changes in scrollbar position or zoom level that can occurred multiple times a second, but long enough to avoid performance degradation. Thus, interrupts arriving from a keyboard, a computer mouse and/or OS types of events are handled in a manner where they can be processed as they arrive. Accordingly, an architecture can include a mechanism for handling regular polling and a mechanism for handling other events.

Figure 5A:
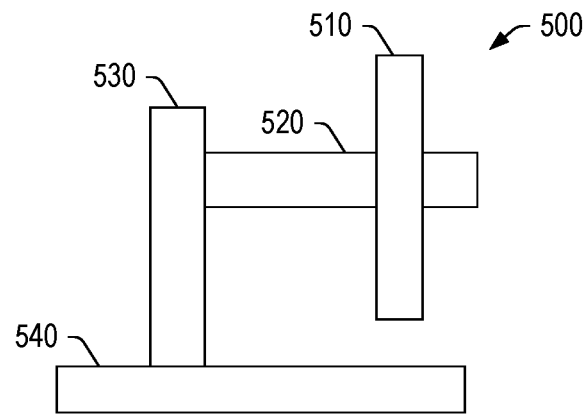
FIG. 5A and FIG. 5B are diagrams of an example of a scroll wheel assembly and signals generated by the scroll wheel assembly.
Figure 5B:
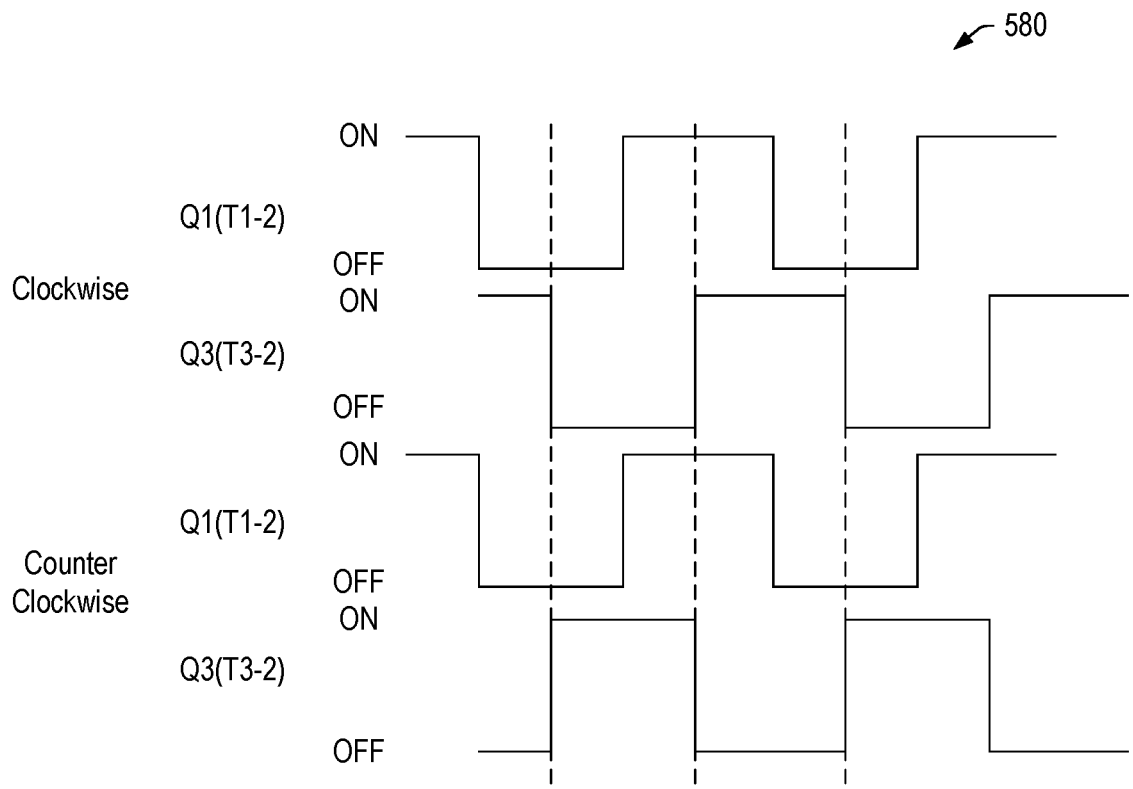

FIG. 5A and FIG. 5B show examples of a scroll wheel assembly 500 and an encoding scheme 560. As shown in FIG. 5A, a scroll wheel assembly 500 can include a scroll wheel 510, an axle 520, a support 530 and encoding circuitry 540. In such an example, the encoding circuitry 540 can encode the position of the scroll wheel 510. As shown in FIG. 5B, the encoding circuitry 540 may operate using terminals T1, T2 and T3 for output on and off signals representative of clockwise rotation and counter-clockwise rotation of the scroll wheel 510. From such signals, information about position, speed, direction, etc., of the scroll wheel 510 can be determined. As an example, such signals may be for events that can be transmitted to an electronic device for processing, for example, in combination with one or more applications, etc.

Figure 6A:
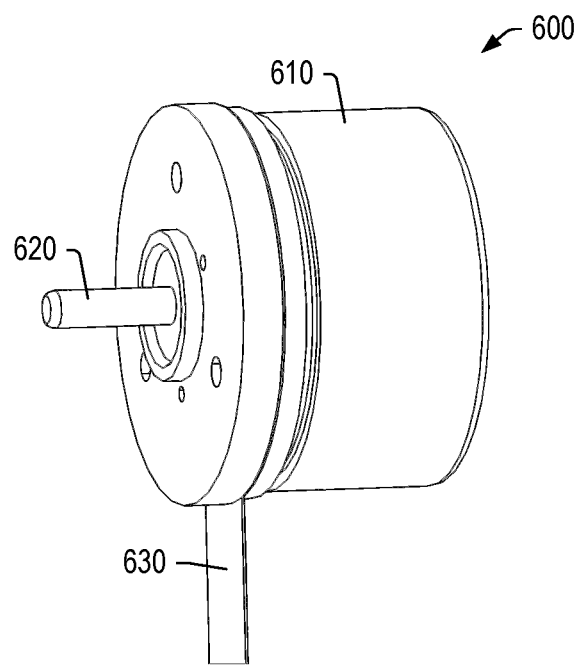
FIG. 6A and FIG. 6B are views of an example of a motor assembly.
Figure 6B:
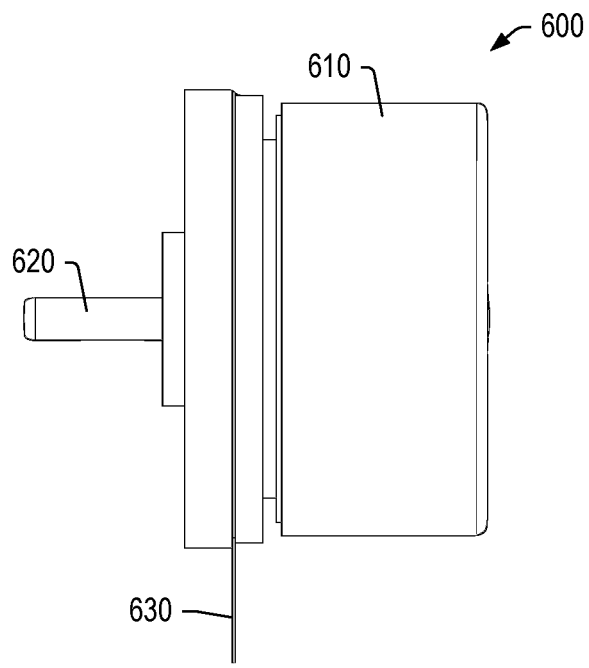

FIG. 6A and FIG. 6B show a perspective view and a side view of an example of a motor assembly 600. As shown, the motor assembly 600 can include a motor 610 with a rotor 620 (e.g., shaft) and circuitry 630. As an example, the motor assembly 600 may be a brushless DC motor (BLDC motor).

As an example, the motor assembly 600 may include one or more features of a MAXON BLDC motor (MAXON Group, Sachseln, Switzerland). For example, consider a 20 mm diameter, brushless, 5 watt motor with or without Hall sensors. Such a motor may be relatively short in its axial body length (e.g., less than 20 mm) and with an appropriate shaft length (e.g., rotor length extending from the body). Such a motor may operate according to a nominal voltage (e.g., 3 V to 24 V), with associated torque, inertia, etc. For example, consider a MAXON BLDC 351XXX motor with a stall torque in a range from approximately 15 mNm to approximately 25 mNm. As another example, consider one or more features of a CONSTAR BLDC motor (CONSTAR, Shenzhen, China). For example, consider a 20 mm diameter, brushless motor with a stall torque of approximately 5 mNm (see, e.g., the CONSTAR BLDC BO2008NBH2B motor or another CONSTAR BLDC motor). As an example, a BLDC motor may include an integrated encoder and/or may be operatively coupled to an encoder (e.g., to translate position, motion of a rotor, etc., to analog and/or digital output signals).

As an example, a motor can provide an amount of torque that is sufficient to rotate a scroll wheel and, for example, to provide haptic feedback via a scroll wheel (e.g., a tactile sensation to a user's finger). As an example, a stall torque may be in a range from 1 mNm to 200 mNm. As an example, a finger of a hand may be utilized to apply a force to a scroll wheel that can be sufficient to stall a rotor of a motor. As an example, a finger of a hand may be utilized to apply a torque that can overcome a stall torque and, for example, turn a rotor of a motor in an opposite direction. As an example, a motor may be controlled as to torque such that torque may be increased and/or decreased in a desired manner (e.g., a programmable manner, etc.). As an example, circuitry may be utilized to sense a stall condition, for example, responsive to application of force to a scroll wheel operatively coupled to a motor. In such an example, circuitry may act to control power to the motor to reduce risk of overheating, etc. As an example, a stall condition of a motor may be considered input, for example, when a user positions a finger on a scroll wheel, operatively coupled to the motor, and applies force sufficient to cause a stall of the motor. As an example, such input may be a stop scroll input, which may terminate a motorized scrolling action and cause transmission of a signal to an electronic device to stop performing an action (e.g., scrolling, zooming, cursor movement, etc.).

As a point of reference, in surgery, two-finger tightness refers to use of two fingers of a human hand to turn a screwdriver to turn a bone screw into a subject's bone. In a study by Wilkofsky et al., How repeatable is two-finger tightness when used to tighten bone screws? (ORS 2013 Annual Meeting, Poster No: 1535), the reported average peak torque to achieve two finger tightness for all subjects was 0.247 Nm (std dev=0.057) (e.g., 247 mNm).

As an example, the motor assembly 600 may be mated with or include a gear body or other ratio adjusting mechanism that can, for example, increase or decrease rotational speed as output by the rotor 620 of the motor assembly 600. As an example, a motor assembly 600 with or without a gear body may be operable over a range of rotational speeds that may be denoted in revolutions per minute (e.g., from less than 1 rpm to more than 1000 rpm). As an example, the motor assembly 600 may be operable to for controlled rotation that is less than one revolution (e.g., clockwise or counter-clockwise). As an example, the motor assembly 600 may be operable in two opposing rotational directions successively, optionally without making a full revolution (e.g., consider switching back and forth according to PWM control, etc.).

Figure 7:
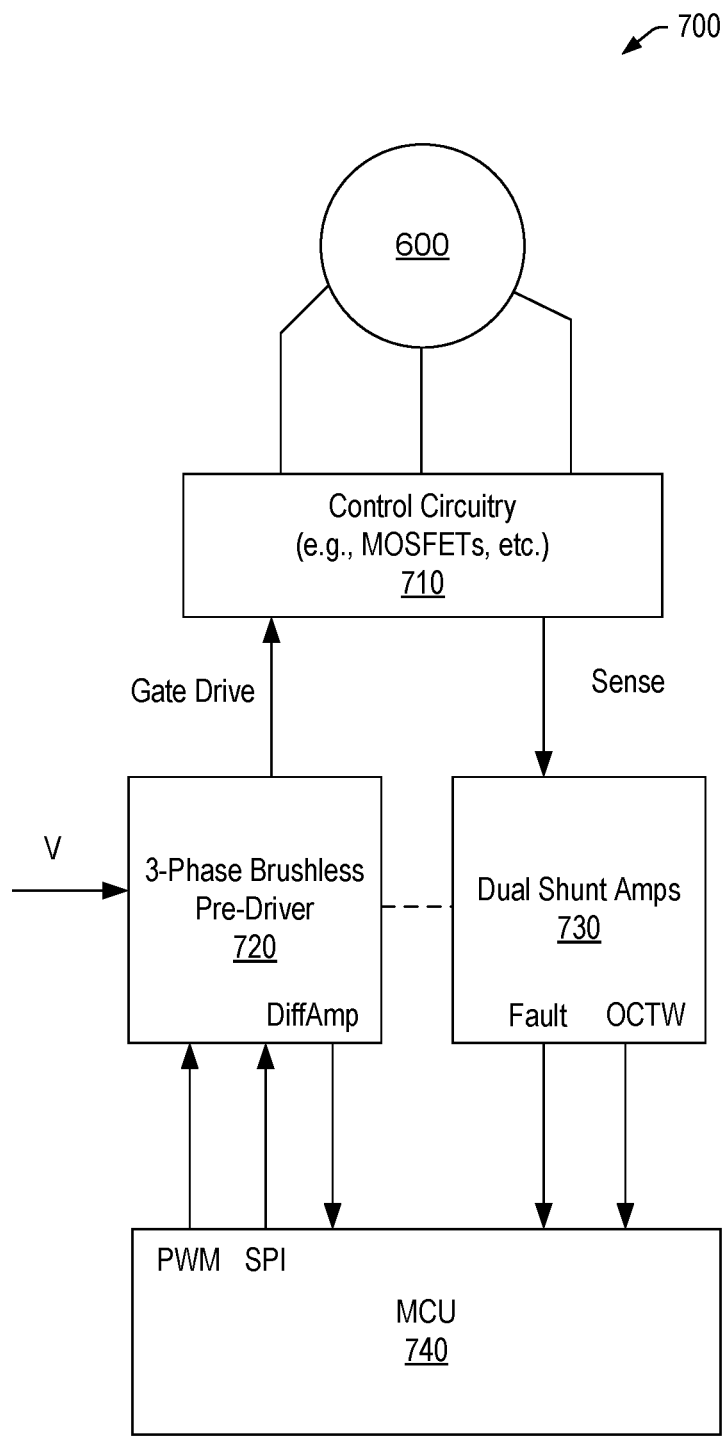
FIG. 7 is a diagram of an example of a system.

FIG. 7 shows an example of a system 700 that includes the motor assembly 600 along with other circuitry, which may include control circuitry 710 (e.g., N-channel MOSFETs and optionally Hall sensors), 3-phase brushless pre-driver circuitry 720, dual shunt amps circuitry 730 (e.g., for bi-directional current measurement) and a microcontroller unit (MCU) 740. As an example, the circuitry 630 of the motor assembly 600 may be operatively coupled to one or more components of the system 700. In such an example, the microcontroller unit (MCU) 740 may output pulse width modulation (PWM) signals to drive the motor assembly 600 where, as shown, the system 700 may also sense output from the control circuitry 710. In such an example, the motor 620 of the motor assembly 600 may be controlled. As shown, the MCU 740 may include a serial peripheral interface (SPI) (e.g., clock and/or other type of interface) and may receive one or more fault and/or other warning signals (e.g., an over-current and/or over-temperature warning (OCTW) signal).

As an example, a system can include a gate driver IC for three-phase motor drive control. For example, consider an IC that integrates three half-bridge drivers, two current shunt amplifiers, and a switching buck converter along with over-current, over-temperature, and under-voltage warning and/or control. A document DRV8303 Three-Phase Gate Driver With Dual-Current Shunt Amplifiers, SLOS846C, September 2013, Revised December 2016 (Texas Instruments, Dallas, Texas), is incorporated by reference herein as to examples of various features of circuitry.

As an example, a BLDC motor may be a gimbal motor that can be operatively coupled to BLDC motor driver circuitry or other suitable circuitry. Gimbal motors tend to have relatively high torque on low velocities and can provide relatively smooth operation.

As an example, a computer mouse may include one or more sensor mechanisms that can sense rotation and/or rotational position. For example, as explained, a scroll wheel assembly may include one or more features for rotation and/or position sensing and a motor assembly may include one or more features for rotation and/or position sensing. As an example, where a computer mouse includes a motor assembly, the motor assembly may be part of a system such as, for example, a system with sensors (e.g., Hall sensors, etc.) that can sense rotation and/or position of a rotor of a motor of the motor assembly. In such an example, a motor assembly system may provide for determinations as to rotation and/or position of a scroll wheel where a rotor of a motor rotates with a scroll wheel (e.g., where the rotor rotational axis and the scroll wheel rotational axis are aligned along a common axis). As an example, where a motor assembly system is present, it may be the only approach that a computer mouse has for determining scroll wheel rotation and/or position. As mentioned, a scroll wheel may also function as a button where the scroll wheel is depressible. As an example, where a motor assembly is operatively coupled to a scroll wheel, at least a portion of the motor assembly (e.g., a motor) may move with the scroll wheel. As an example, a motor and a scroll wheel may be supported by a common support or common supports, which may provide for resilient up and down movements as associated with a scroll wheel functioning as a depressible button.

Figure 8:
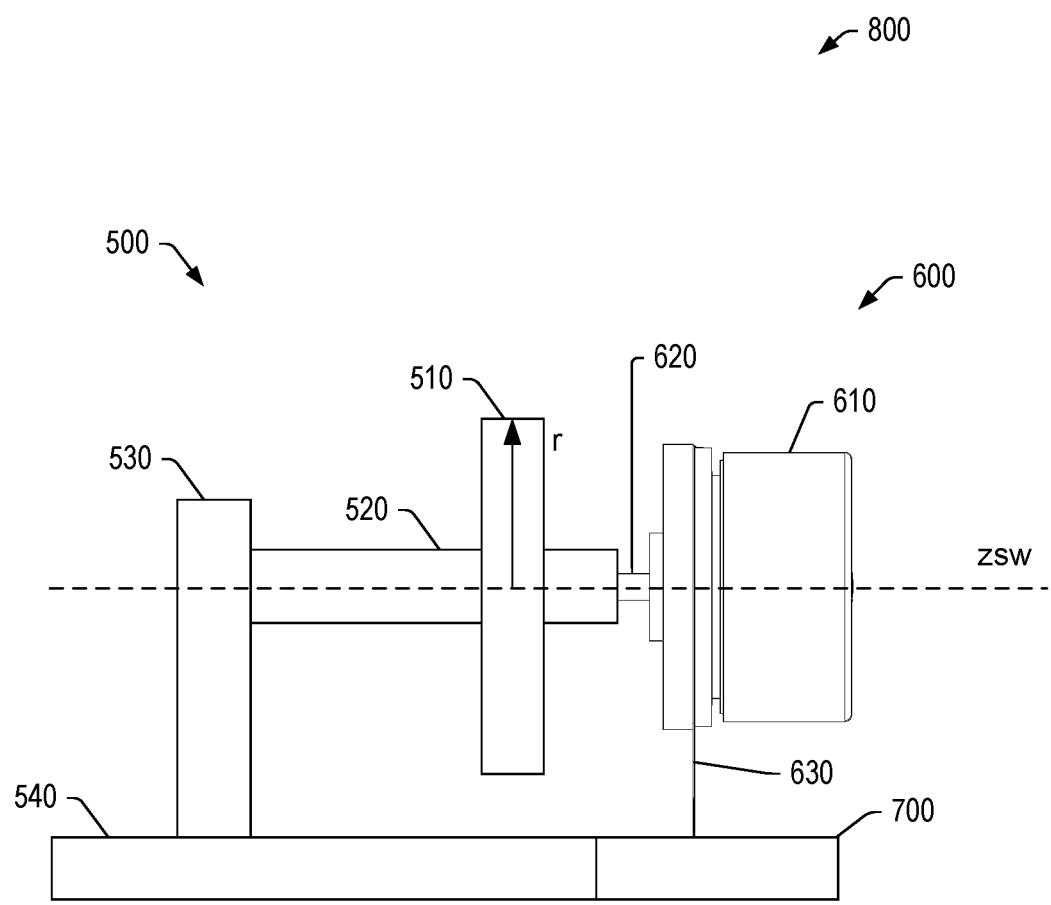
FIG. 8 is a diagram of an example of a system.

FIG. 8 shows an example of a system 800 where the motor assembly 600 is operatively coupled to the scroll wheel assembly 500 where the circuitry 540 and various components of the system 700 may be included. In such an example, the motor 610 of the motor assembly 600 may be of a smaller diameter than the diameter of the scroll wheel 510. For example, the scroll wheel 510 can extend outwardly from a surface of a computer mouse while the motor 610 of the motor assembly 600 does not. As explained, the motor 610 can include a stator and the rotor 620 where the rotor 620 can include a shaft portion that extends outwardly from the motor 610. In one or more manners, the rotor 620 can be operatively coupled to the scroll wheel 510, for example, at the shaft 520 of the scroll wheel 510 (see, the scroll wheel axis zsw as being an axis of rotation for the scroll wheel 510 and the rotor 620). As an example, the rotor 620 may extend to the support 530 where the motor 610 may be supported in part by the support 530. As an example, the motor assembly 600 may have a motor mass of less than 100 grams, for example, consider less than 50 grams or less than 25 grams. As mentioned, the support 530 and/or one or more other components may provide for some up and down motion of the scroll wheel 510 such that the scroll wheel 510 can act as a button.

In the example of FIG. 8, the motor assembly 600 may be utilized to impart force to the scroll wheel 510 (e.g., torque), which may cause the scroll wheel 510 to vibrate, to rotate, to exert force, etc. As explained, a user may place a finger on the scroll wheel 510. In such an example, when the motor assembly 600 is actuated, the rotor 620 may cause force to be applied to the scroll wheel 510 that may be sensed by the finger of the user, which may be a haptic type of sensing.

As explained with respect to the plot 300 of FIG. 3, various computer mouse scroll wheel navigation actions can be less than 1 second while others may extend to 5 seconds or more. As an example, a computer mouse that includes a motor assembly operatively coupled to a scroll wheel may provide for scroll wheel actions that can be performed with or without human contact with the scroll wheel. For example, consider an initial rate of rotation set by human contact where that rate may be sensed as input to instruct a motor assembly to rotate the scroll wheel at that rate, for example, until a further instruction stops such rotation (e.g., a human finger applying force to the scroll wheel to increase drag on a rotor of the motor assembly). In such an example, a user may set a scrolling speed for a document where the motor assembly acts to continue scrolling at the set scrolling speed (e.g., a number of lines per minute, cells per minute, etc.). In such an example, a user interaction with a scroll wheel may be reduced while scrolling action continues, optionally without human contact.

As an example, where a computer mouse includes voice recognition circuitry, a voice command may be uttered to cause a motor assembly to rotate a scroll wheel at a desired rotational speed where, for example, one or more additional voice commands may cause the rotational speed to increase or decrease, which may include going to zero (e.g., stopping rotation). As an example, a voice command may be a flick command where a motor is controlled to mimic a flick to a scroll wheel by a human finger.

As an example, a computer mouse may include a speaker as part of circuitry where the speaker can generate click sounds and/or click movements. As an example, where a computer mouse includes a motor assembly operatively coupled to a scroll wheel, the motor assembly may be controllable to impart haptic feedback, which may be in the form of click-like variations in force to rotate a scroll wheel. In such an example, the click-like variations may be controllable with respect to frequency, number of degrees of rotation of a scroll wheel, etc. As an example, such an approach to generation of a click-like response may be achieved in a non-contact manner where two components do not contact each other; rather, magnetic and/or electromagnetic forces may be used to simulate the feel of a mechanical click and/or a sound of a mechanical click. Through use of a motor assembly, various types of feedback may be generated that can include click-like feedback and optionally other types of feedback, which may not be practically achieved using a mechanical approach involving contacting components.

As an example, a computer mouse can include a catapult mode for a scroll wheel. For example, consider using a motor to provide a counter scroll force to mimic winding of rubber band feeling to a finger of a user where, when user slips the scroll wheel and/or press a separate mouse button, the "rubber band" unwinds, for example, to direct an object, a cursor, etc. In such an example, the action may be to shoot an object in a particular direction. As mentioned, a game may include a bow and arrow where pulling back on the bow is achieved via rotation of a scroll wheel where the scroll wheel can, via a motor, mimic an increase in force as the string of the bow is pulled further back. As explained, a computer mouse with a motor coupled to a scroll wheel can provide for various types of force feedback (e.g., when loading and shooting arrows, etc.). As an example, one or more actions may be utilized in a game such as the ANGRY BIRDS game. As to various types of business applications, a catapult mode may be implemented, for example, at a boundary of a document, a webpage, a spreadsheet, etc.

As an example, a software development kit (SDK) may be utilized to integrate one or more functions of a computer mouse into an application, a game, etc., for example, by using API calls, hooks, etc.

Figure 9:
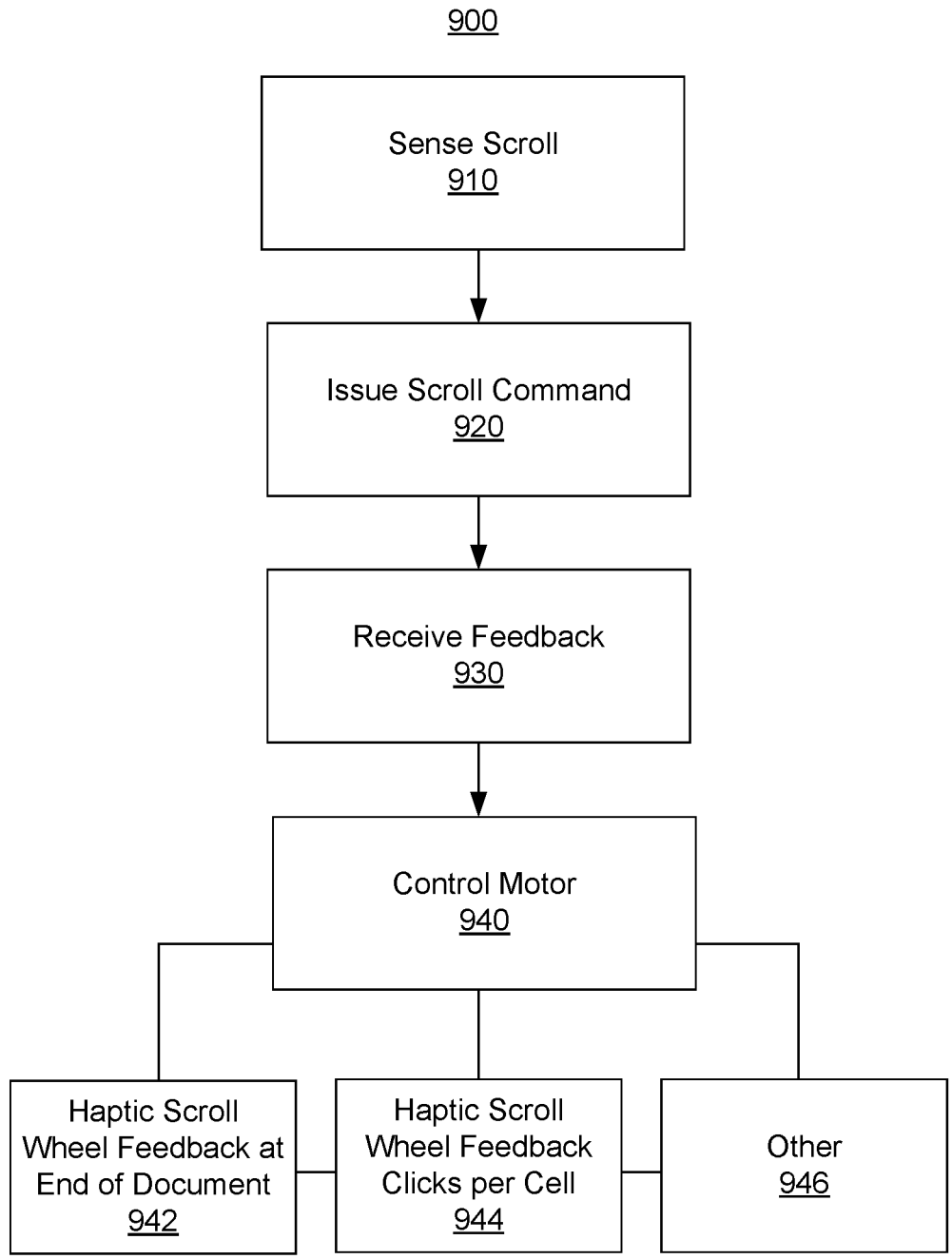
FIG. 9 is a diagram of an example of a method.

FIG. 9 shows an example of a method 900 that includes a sense block 910 for sensing scrolling, an issuance block 920 for issuing a scroll command, a reception block 930 for receiving feedback and a control block 940 for controlling a motor. In such an example, the control block 940 may provide for haptic scroll wheel feedback at the end of a document, haptic scroll wheel feedback as one or more clicks per line and/or per cell (e.g., in a spreadsheet application), and/or one or more other actions.

Figure 10:
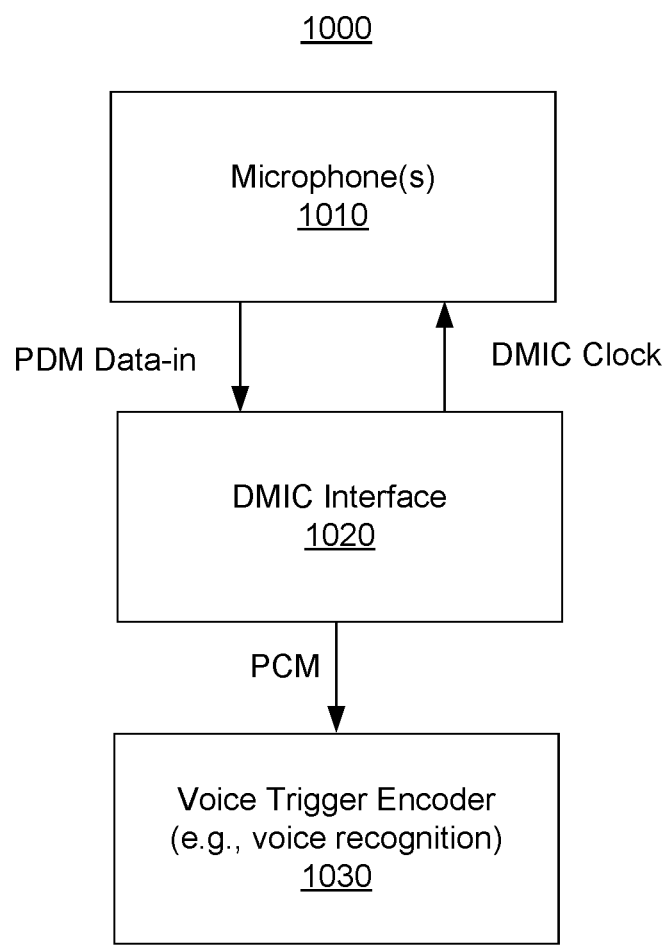
FIG. 10 is a diagram of an example of a system.

FIG. 10 shows an example of a voice recognition system 1000 that includes one or more microphones, a digital microphone (DMIC) interface 1020 and a voice trigger encoder (e.g., voice recognition circuitry) 1030. As shown, the one or more microphones 1010 can provide PDM data as input for the DMIC interface 1020, which can provide PCM output to the voice trigger encoder 1030. A document AN11855, Voice Detection and Recognition, Application note, 2.0, 30 Sep. 2016 (NXP B.V., Eindhoven, Netherlands) is incorporated by reference herein as to examples of various features of circuitry.

Figure 11:
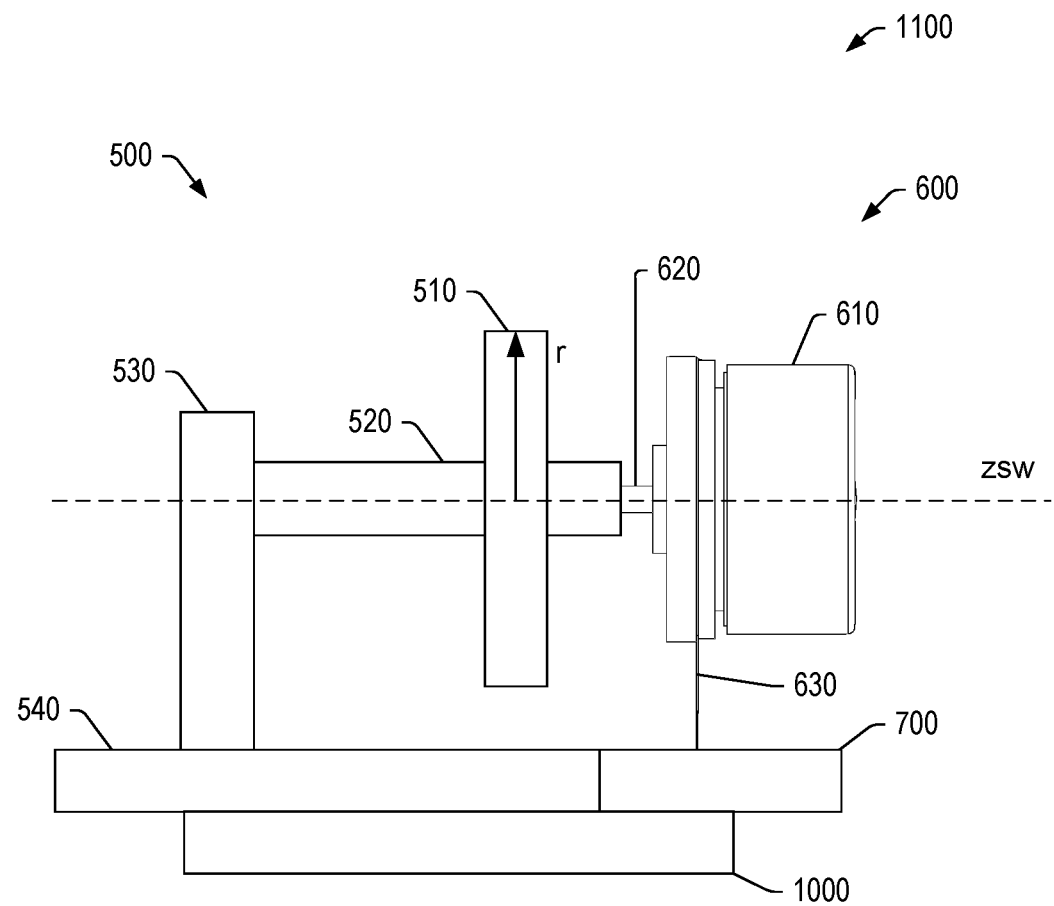
FIG. 11 is a diagram of an example of a system.

FIG. 11 shows an example of a system 1100 akin to the system 800 of FIG. 8; however, now including the voice recognition system (VRS) 1000 of FIG. 10. In such an example, a user may utter a command that can be interpreted by the VRS 1000, which may, in turn, issue a command to the system 700 for control of the motor assembly 600, for example, to cause force to be applied by the rotor 620 to the scroll wheel 510.

Figure 12:
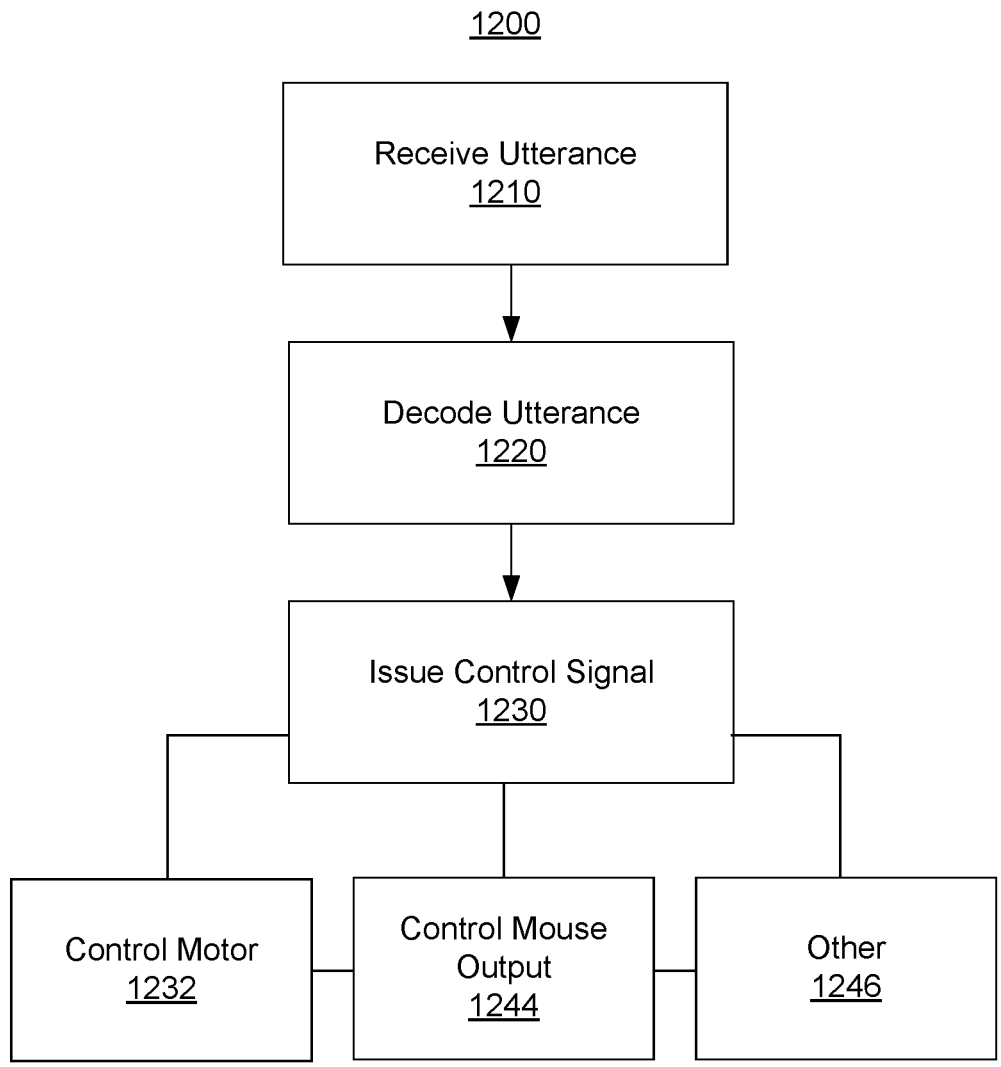
FIG. 12 is a diagram of an example of a method.

FIG. 12 shows an example of a method 1200 that includes a reception block 1210 for receiving an utterance, a decode block 1220 for decoding the utterance, and an issuance block 1230 for issuing a control signal, which may, for example, control a motor 1232, control computer mouse output 1244 and/or one or more other actions 1246. As to one of the one or more other actions 1246, consider switching a computer mouse from being paired with one electronic device to being paired with another electronic device. For example, consider a user uttering "pair mouse with laptop" or "pair mouse with desktop" or "pair mouse with smart TV". As to the control of mouse output 1244, an utterance may be to scroll, to move a cursor, to select a menu item, etc.

While various types of electronic devices may have voice recognition circuitry, a system such as the system 1100 of FIG. 11 can provide voice recognition capabilities through a voice enabled computer mouse. As an example, a voice enabled computer mouse with a motor assembly can be operable in one or more manners. For example, consider an utterance to scroll where scrolling occurs by transmitting a command to an electronic device or where scrolling occurs by causes a rotor of the motor assembly to rotate a scroll wheel of the computer mouse. As an example, a voice enabled computer mouse may operate in one or more manners, with or without a motor assembly.

Figure 13:
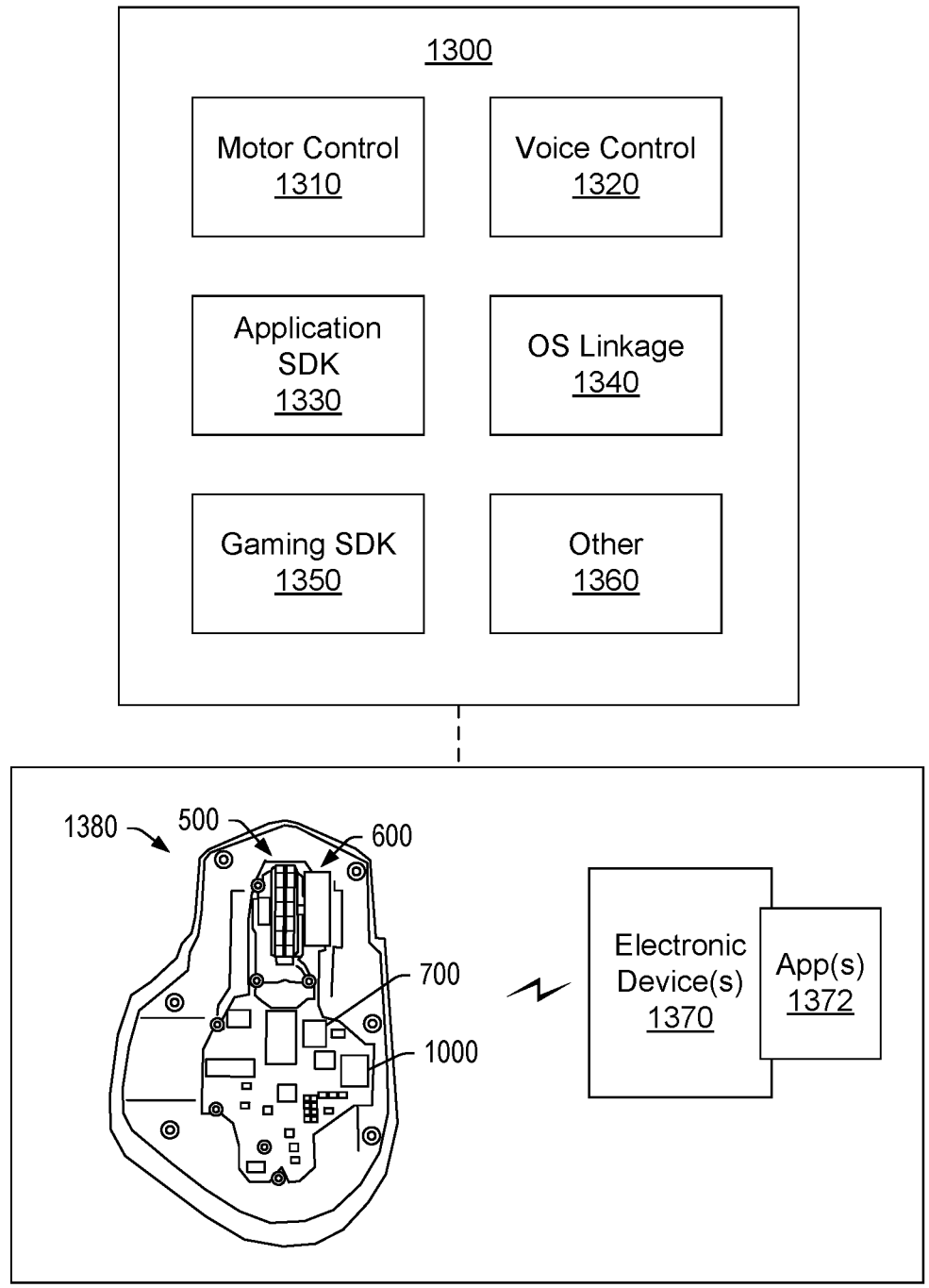
FIG. 13 is a diagram of an example of a framework, an example of a computer mouse and an example of one or more electronic devices that can execute one or more applications.

FIG. 13 shows an example of a framework 1300 that includes a motor control block 1310, a voice control block 1320, an application software development kit (SDK) block 1330, an OS linkage block 1340, a gaming SDK block 1350 and one or more other blocks 1360, along with an example of one or more electronic devices 1370, examples of one or more applications 1372, and an example of a computer mouse 1380 (e.g., without an upper housing component) that can include one or more features of the scroll wheel assembly 500, one or more features of the motor assembly 600, one or more features of the system 700, and one or more features of the voice recognition system (VRS) 1000. In the example of FIG. 13, the computer mouse 1380 can include one or more features of the computer mouse 100.

As an example, the framework 1300 may be utilized with one or more computer mice, where the one or more computer mice can include a motor assembly and/or voice recognition circuitry. As an example, a software development kit (SDK) may be utilized to integrate one or more functions of a computer mouse into an application, a game, etc., for example, by using API calls, hooks, etc.

As explained, a computer mouse can include a motor, which may provide for torque, revolution, etc., of a scroll wheel. In such an example, one or more sensors may be utilized, for example, consider a Hall sensor based angle position encoder sensor that can form a closed loop active torque system to provide variable torque/rotation feedback. As explained, one or more features may be driven by software control (e.g., driver layer, application layer, etc.) where such control may provide for feedback from one or more position encoders.

As mentioned, a motor may be controlled for one or more purposes. As an example, consider control for a free mode (e.g., motor not applying force for free scroll wheel rotation) and a click mode (e.g., a fixed click or variable click suitable for use with an application layer). As an example, a computer mouse may provide for receipt of various types of information from an electronic device, which may include application information (e.g., as to boundaries, zoom, scroll features, cells, lines, etc.).

As an example, a motor may be powered to generate torque in reverse spin direction quickly, which may be interpreted as a click (e.g., a simulated click that can be felt by a user's finger). As an example, click simulation may be based in part on one or more features in an application layer and/or an OS layer. As an example, a snap back effect may be generated via motor control, for example, to snap back a scroll at the end of a document or webpage. As an example, an application layer may translate active scroll torque command to a closed loop controller as driving signals to a motor. As an example, a motor may be controlled to apply force in reverse spin direction of a scroll wheel, for example, to simulate a spring loaded action.

As an example, a computer mouse can include a scroll wheel assembly that includes a scroll wheel rotatable about a scroll wheel axis; and a motor assembly that includes a rotor aligned with the scroll wheel axis and operatively coupled to the scroll wheel.

As an example, a motor assembly can include a motor. As an example, a motor may be a DC motor. As an example, a DC motor may be a brushless DC motor (BLDC motor).

As an example, a computer mouse can include motor control circuitry. In such an example, the motor control circuitry can control force applied to a rotor where the rotor is operatively coupled to a scroll wheel of the computer mouse. In such an example, the rotor may be part of an axle upon which the scroll wheel is mounted or, for example, the rotor may be coupled via a coupling to an axle of the scroll wheel. As explained, a rotor of a motor may be coupled to a gear body that may provide for a decrease or an increase in rotational motion, torque, etc.

As an example, motor control circuitry can include a haptic feedback mode. For example, consider a haptic feedback mode that calls for application of force to a rotor of a motor based on a position of a scroll boundary for a graphical user interface where the rotor is operatively coupled to a scroll wheel. As an example, a haptic feedback mode may call for application of force to a rotor to simulate scroll wheel clicks. In such an example, each of the scroll wheel clicks may be associated with one or more of one or more lines of text and one or more cells of a spreadsheet. For example, consider a programmable function that can set a rate of simulated clicks with respect to line or lines of text, cell or cells of a spreadsheet, etc. As explained, clicks may be simulated in a non-contact manner where an increase in resistance to rotation of a scroll wheel is effectuated using magnetic and/or electromagnetic phenomena via a motor (e.g., interaction between a rotor and a stator of a motor).

As an example, motor control circuitry can provide a catapult feedback mode. As explained, a catapult feedback mode can simulate winding of a spring where, for example, as the spring becomes more wound, the force required to further wind the spring increases. As explained, a catapult feedback mode may simulate a bow with a string where, for example, as the string is pulled back, the force to further pull back the spring increases. In such an example, upon release of a scroll wheel, the catapult feedback mode may terminate the haptic effect or, for example, cause the scroll wheel to spin in an opposite direction (e.g., akin to the string of the bow moving forward once it is released to shoot an arrow).

As an example, a computer mouse can include voice recognition circuitry that includes one or more microphones. In such an example, the voice recognition circuitry can generate motor control commands responsive to decoded utterances, where the utterances are received by at least one of the one or more microphones. As an example, motor control commands can include a scroll command that calls for rotation of a rotor of a motor to rotate a scroll wheel. In such an example, rotation of the rotor to rotate the scroll wheel can cause generation of a scroll command that is transmissible to an electronic device for navigation of a graphical user interface; rotation of the rotor to rotate the scroll wheel can cause generation of a zoom command that is transmissible to an electronic device for navigation of a graphical user interface; and/or provide one or more other actions.

As an example, voice recognition circuitry can generate navigation commands that are transmissible to an electronic device for navigation of a graphical user interface. In such an example, the navigation commands can include a cursor movement command and a scroll command. As an example, navigation commands may include various types of commands, which may depend on type of application, operating system, electronic device, etc., that a computer mouse is utilized for control (e.g., interaction with graphical control elements of one or more GUIs, etc.).

As an example, a method can include sensing scrolling by rotation of a scroll wheel of a computer mouse that generates a scroll command to navigate a graphical user interface; receiving feedback as to a position of a boundary in the graphical user interface; and, responsive to the feedback, causing a rotor of a motor assembly to apply force to the scroll wheel, where the rotor is aligned with a rotational axis of the scroll wheel. In such an example, the boundary can correspond to a document boundary that includes an end of document boundary or a beginning of a document boundary (e.g., vertical and/or horizontal).

As an example, a method can include receiving an utterance by a microphone of a computer mouse; decoding the utterance; and issuing a control signal based on the decoding. In such an example, the control signal can include or be a motor control signal that controls a motor assembly of the computer mouse, where the motor assembly includes a rotor operative coupled to a scroll wheel of the computer mouse.

As an example, a computer program product can include instructions to instruct a computing device, a computing system, etc., to perform one or more methods.

The term "circuit" or "circuitry" is used in the summary, description, and/or claims. As is well known in the art, the term "circuitry" includes all levels of available integration, e.g., from discrete logic circuits to the highest level of circuit integration such as VLSI, and includes programmable logic components programmed to perform the functions of an embodiment as well as general-purpose or special-purpose processors programmed with instructions to perform those functions. Such circuitry may optionally rely on one or more computer-readable media that includes computer-executable instructions. As described herein, a computer-readable medium may be a storage device (e.g., a memory card, a storage disk, etc.) and referred to as a computer-readable storage medium.

Figure 14:
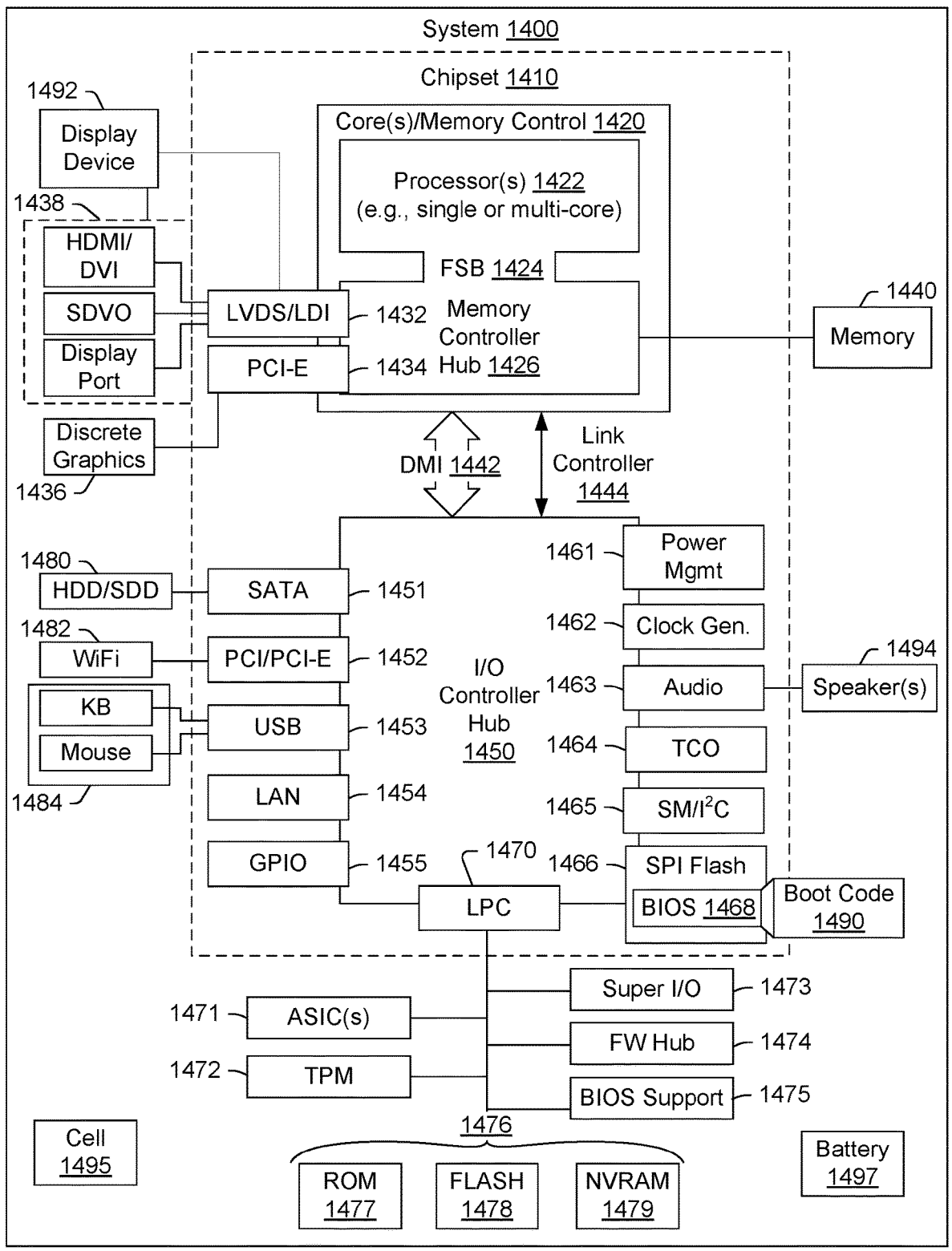
FIG. 14 is a diagram of an example of a system.

While various examples of circuits or circuitry have been discussed, FIG. 14 depicts a block diagram of an illustrative computer system 1400. The system 1400 may be a computer system sold by Lenovo (US) Inc. of Morrisville, NC (e.g., a THINKSTATION system, etc.); however, as apparent from the description herein, a satellite, a base, a display, a dock, a keyboard, a computing device, a server or other machine may include one or more features and/or other features of the system 1400.

As an example, a monitor or display may include features such as one or more of the features included in one of the LENOVO IDEACENTRE or THINKCENTRE "all-in-one" (AIO) computing devices (e.g., sold by Lenovo (US) Inc. of Morrisville, NC). For example, the LENOVO IDEACENTRE A720 computing device includes an INTEL CORE I7 processor, a 27 inch frameless multi-touch display (e.g., for HD resolution of 1920×1080), a NVIDIA GEFORCE GT 630M 2 GB graphics card, 8 GB DDR3 memory, a hard drive, a DVD reader/writer, integrated BLUETOOTH and 802.11b/g/n WI-FI, USB connectors, a 6-in-1 card reader, a webcam, HDMI in/out, speakers, and a TV tuner.

As shown in FIG. 14, the system 1400 includes a so-called chipset 1410. A chipset refers to a group of integrated circuits, or chips, that are designed to work together. Chipsets are usually marketed as a single product (e.g., consider chipsets marketed under the brands INTEL, AMD, etc.).

In the example of FIG. 14, the chipset 1410 has a particular architecture, which may vary to some extent depending on brand or manufacturer. The architecture of the chipset 1410 includes a core and memory control group 1420 and an I/O controller hub 1450 that exchange information (e.g., data, signals, commands, etc.) via, for example, a direct management interface or direct media interface (DMI) 1442 or a link controller 1444. In the example of FIG. 14, the DMI 1442 is a chip-to-chip interface (sometimes referred to as being a link between a "northbridge" and a "southbridge").

The core and memory control group 1420 include one or more processors 1422 (e.g., single core or multi-core) and a memory controller hub 1426 that exchange information via a front side bus (FSB) 1424. As described herein, various components of the core and memory control group 1420 may be integrated onto a single processor die, for example, to make a chip that supplants the conventional "northbridge" style architecture.

The memory controller hub 1426 interfaces with memory 1440. For example, the memory controller hub 1426 may provide support for DDR SDRAM memory (e.g., DDR, DDR2, DDR3, etc.). In general, the memory 1440 is a type of random-access memory (RAM). It is often referred to as "system memory".

The memory controller hub 1426 further includes a low-voltage differential signaling interface (LVDS) 1432. The LVDS 1432 may be a so-called LVDS Display Interface (LDI) for support of a display device 1492 (e.g., a CRT, a flat panel, a projector, etc.). A block 1438 includes some examples of technologies that may be supported via the LVDS interface 1432 (e.g., serial digital video, HDMI/DVI, display port). The memory controller hub 1426 also includes one or more PCI-express interfaces (PCI-E) 1434, for example, for support of discrete graphics 1436. Discrete graphics using a PCI-E interface has become an alternative approach to an accelerated graphics port (AGP). For example, the memory controller hub 1426 may include a 16-lane (x16) PCI-E port for an external PCI-E-based graphics card. A system may include AGP or PCI-E for support of graphics. As described herein, a display may be a sensor display (e.g., configured for receipt of input using a stylus, a finger, etc.). As described herein, a sensor display may rely on resistive sensing, optical sensing, or other type of sensing.

The I/O hub controller 1450 includes a variety of interfaces. The example of FIG. 14 includes a SATA interface 1451, one or more PCI-E interfaces 1452 (optionally one or more legacy PCI interfaces), one or more USB interfaces 1453, a LAN interface 1454 (more generally a network interface), a general purpose I/O interface (GPIO) 1455, a low-pin count (LPC) interface 1470, a power management interface 1461, a clock generator interface 1462, an audio interface 1463 (e.g., for speakers 1494), a total cost of operation (TCO) interface 1464, a system management bus interface (e.g., a multi-master serial computer bus interface) 1465, and a serial peripheral flash memory/controller interface (SPI Flash) 1466, which, in the example of FIG. 14, includes BIOS 1468 and boot code 1490. With respect to network connections, the I/O hub controller 1450 may include integrated gigabit Ethernet controller lines multiplexed with a PCI-E interface port. Other network features may operate independent of a PCI-E interface.

The interfaces of the I/O hub controller 1450 provide for communication with various devices, networks, etc. For example, the SATA interface 1451 provides for reading, writing or reading and writing information on one or more drives 1480 such as HDDs, SDDs or a combination thereof. The I/O hub controller 1450 may also include an advanced host controller interface (AHCI) to support one or more drives 1480. The PCI-E interface 1452 allows for wireless connections 1482 to devices, networks, etc. The USB interface 1453 provides for input devices 1484 such as keyboards (KB), one or more optical sensors, mice and various other devices (e.g., microphones, cameras, phones, storage, media players, etc.). On or more other types of sensors may optionally rely on the USB interface 1453 or another interface (e.g., 12C, etc.). As to microphones, the system 1400 of FIG. 14 may include hardware (e.g., audio card) appropriately configured for receipt of sound (e.g., user voice, ambient sound, etc.).

In the example of FIG. 14, the LPC interface 1470 provides for use of one or more ASICs 1471, a trusted platform module (TPM) 1472, a super I/O 1473, a firmware hub 1474, BIOS support 1475 as well as various types of memory 1476 such as ROM 1477, Flash 1478, and non-volatile RAM (NVRAM) 1479. With respect to the TPM 1472, this module may be in the form of a chip that can be used to authenticate software and hardware devices. For example, a TPM may be capable of performing platform authentication and may be used to verify that a system seeking access is the expected system.

The system 1400, upon power on, may be configured to execute boot code 1490 for the BIOS 1468, as stored within the SPI Flash 1466, and thereafter processes data under the control of one or more operating systems and application software (e.g., stored in system memory 1440). An operating system may be stored in any of a variety of locations and accessed, for example, according to instructions of the BIOS 1468. Again, as described herein, a satellite, a base, a server or other machine may include fewer or more features than shown in the system 1400 of FIG. 14. Further, the system 1400 of FIG. 14 is shown as optionally include cell phone circuitry 1495, which may include GSM, CDMA, etc., types of circuitry configured for coordinated operation with one or more of the other features of the system 1400. As shown, the system 1400 may include one or more batteries 1497 and, for example, battery management circuitry.

Although examples of methods, devices, systems, etc., have been described in language specific to structural features and/or methodological acts, it is to be understood that the subject matter defined in the appended claims is not necessarily limited to the specific features or acts described. Rather, the specific features and acts are disclosed as examples of forms of implementing the claimed methods, devices, systems, etc.

What is claimed is:

1. A computer mouse comprising:
    a scroll wheel assembly that comprises a scroll wheel rotatable about a scroll wheel axis;
    a motor assembly that comprises a rotor aligned with the scroll wheel axis and operatively coupled to the scroll wheel, wherein the motor assembly comprises a brushless DC motor; and
    motor control circuitry for control of the brushless DC motor, wherein the motor control circuitry senses a stall condition as input responsive to application of force to the scroll wheel that overcomes a torque of the brushless DC motor, wherein the motor control circuitry controls power to the brushless DC motor responsive to a sense of the stall condition to reduce risk of overheating, and wherein the motor control circuitry comprises a haptic feedback mode to generate haptic feedback via the scroll wheel via application of force to the rotor by the brushless DC motor.

2. The computer mouse of claim 1, wherein the haptic feedback mode calls for the application of force to the rotor based on a position of a scroll boundary for a graphical user interface.

3. The computer mouse of claim 1, wherein the haptic feedback mode calls for the application of force to the rotor to simulate scroll wheel clicks.

4. The computer mouse of claim 3, wherein each of the scroll wheel clicks is associated with one or more of one or more lines of text and one or more cells of a spreadsheet.

5. The computer mouse of claim 1, wherein the motor control circuitry comprises a catapult feedback mode.

6. The computer mouse of claim 1, comprising voice recognition circuitry that comprises one or more microphones.

7. The computer mouse of claim 6, wherein the voice recognition circuitry generates motor control commands responsive to decoded utterances, wherein the utterances are received by at least one of the one or more microphones.

8. The computer mouse of claim 6, wherein the voice recognition circuitry generates navigation commands that are transmissible to an electronic device for navigation of a graphical user interface.

9. The computer mouse of claim 8, wherein the navigation commands comprise a cursor movement command and a scroll command.

10. A method comprising:
    receiving an utterance by a microphone of a computer mouse;
    decoding the utterance; and
    issuing a control signal based on the decoding, wherein the control signal comprises a motor control signal that controls a motor assembly of the computer mouse, wherein the motor assembly comprises a rotor operative coupled to a scroll wheel of the computer mouse.

11. A computer mouse comprising:
    a scroll wheel assembly that comprises a scroll wheel rotatable about a scroll wheel axis;
    a motor assembly that comprises a rotor aligned with the scroll wheel axis and operatively coupled to the scroll wheel; and
    voice recognition circuitry that comprises one or more microphones, wherein the voice recognition circuitry generates motor control commands responsive to decoded utterances, wherein the utterances are received by at least one of the one or more microphones.

12. The computer mouse of claim 11, wherein the motor control commands comprise a scroll command that calls for rotation of the rotor to rotate the scroll wheel.

13. The computer mouse of claim 12, wherein the rotation of the rotor to rotate the scroll wheel causes generation of a scroll command that is transmissible to an electronic device for navigation of a graphical user interface.

14. The computer mouse of claim 12, wherein the rotation of the rotor to rotate the scroll wheel causes generation of a zoom command that is transmissible to an electronic device for navigation of a graphical user interface.

15. The computer mouse of claim 11, wherein the voice recognition circuitry generates navigation commands that are transmissible to an electronic device for navigation of a graphical user interface.

16. The computer mouse of claim 15, wherein the navigation commands comprise a cursor movement command and a scroll command.

17. A method comprising:
    performing a motorized scroll wheel action using a brushless DC motor of a computer mouse coupled to a scroll wheel of the computer mouse for rotation of the scroll wheel;
    sensing a stall condition of the brushless DC motor as input, wherein the stall condition is responsive to application of force to the scroll wheel by a finger;
    responsive to the sensing of the stall condition, controlling power to the brushless DC motor to reduce risk of overheating; and
    based on the input, transmitting a signal to an electronic device to stop performing an action.

18. The method of claim 17, wherein the action of the electronic device comprises one or more of a scrolling action, a zooming action, and a cursor movement action.

* * * * *